United States Patent
Preissler et al.

(10) Patent No.: US 10,851,697 B2
(45) Date of Patent: Dec. 1, 2020

(54) APPARATUS FOR MIXING EXHAUST GAS AND AN ADDITIVE

(71) Applicant: MAN Truck & Bus AG, Munich (DE)

(72) Inventors: Martin Preissler, Munich (DE);
Roland Griesbeck, Nuremberg (DE);
Tim Aupperle, Nuremberg (DE);
Herbert Albert, Erlangen (DE)

(73) Assignee: MAN Truck & Bus AG, Munich (DE)

( * ) Notice: Subject to any disclaimer, the term of this patent is extended or adjusted under 35 U.S.C. 154(b) by 0 days.

(21) Appl. No.: 16/277,799

(22) Filed: Feb. 15, 2019

(65) Prior Publication Data
US 2019/0249584 A1 Aug. 15, 2019

(30) Foreign Application Priority Data
Feb. 15, 2018 (DE) .......................... 10 2018 103 368

(51) Int. Cl.
| | |
|---|---|
| *F01N 3/28* | (2006.01) |
| *F01N 3/20* | (2006.01) |
| *B01F 3/04* | (2006.01) |
| *B01F 5/04* | (2006.01) |
| *B01F 5/06* | (2006.01) |
| *B01F 5/00* | (2006.01) |

(52) U.S. Cl.
CPC ............ *F01N 3/28* (2013.01); *B01F 3/04049* (2013.01); *B01F 5/0057* (2013.01);
(Continued)

(58) Field of Classification Search
CPC .. B01F 3/04049; B01F 5/0057; B01F 5/0451; B01F 5/0648; B01F 2005/0022;
(Continued)

(56) References Cited

U.S. PATENT DOCUMENTS

| | | |
|---|---|---|
| 2010/0186393 A1 | 7/2010 | Kowada |
| 2014/0230418 A1 | 8/2014 | Perrot |
| 2015/0308316 A1 | 10/2015 | Li |

FOREIGN PATENT DOCUMENTS

| | | |
|---|---|---|
| DE | 10 2012 008 556 A1 | 10/2013 |
| DE | 112013000014 T5 | 11/2014 |

(Continued)

OTHER PUBLICATIONS

Machine translation of DE 102016004333 A1 to Haas et. al. (Year: 2017).*

(Continued)

*Primary Examiner* — Brandon D Lee
(74) *Attorney, Agent, or Firm* — Maginot, Moore & Beck LLP

(57) ABSTRACT

An apparatus for mixing an exhaust gas stream with an additive, in particular a reducing agent. The apparatus has a mixing pipe for mixing the exhaust gas stream with the additive. The apparatus has a first deflection pipe for deflecting the exhaust gas stream, in particular by about 180°. The exhaust gas stream can be fed to the mixing pipe on the end side via the first deflection pipe. The first deflection pipe has a fastening region for attaching an additive injector to the first deflection pipe. The first deflection pipe has a swirl generating wall region arranged on the end side with respect to the mixing pipe and is configured to impart a swirl to the exhaust gas stream.

17 Claims, 8 Drawing Sheets

Figure 1:
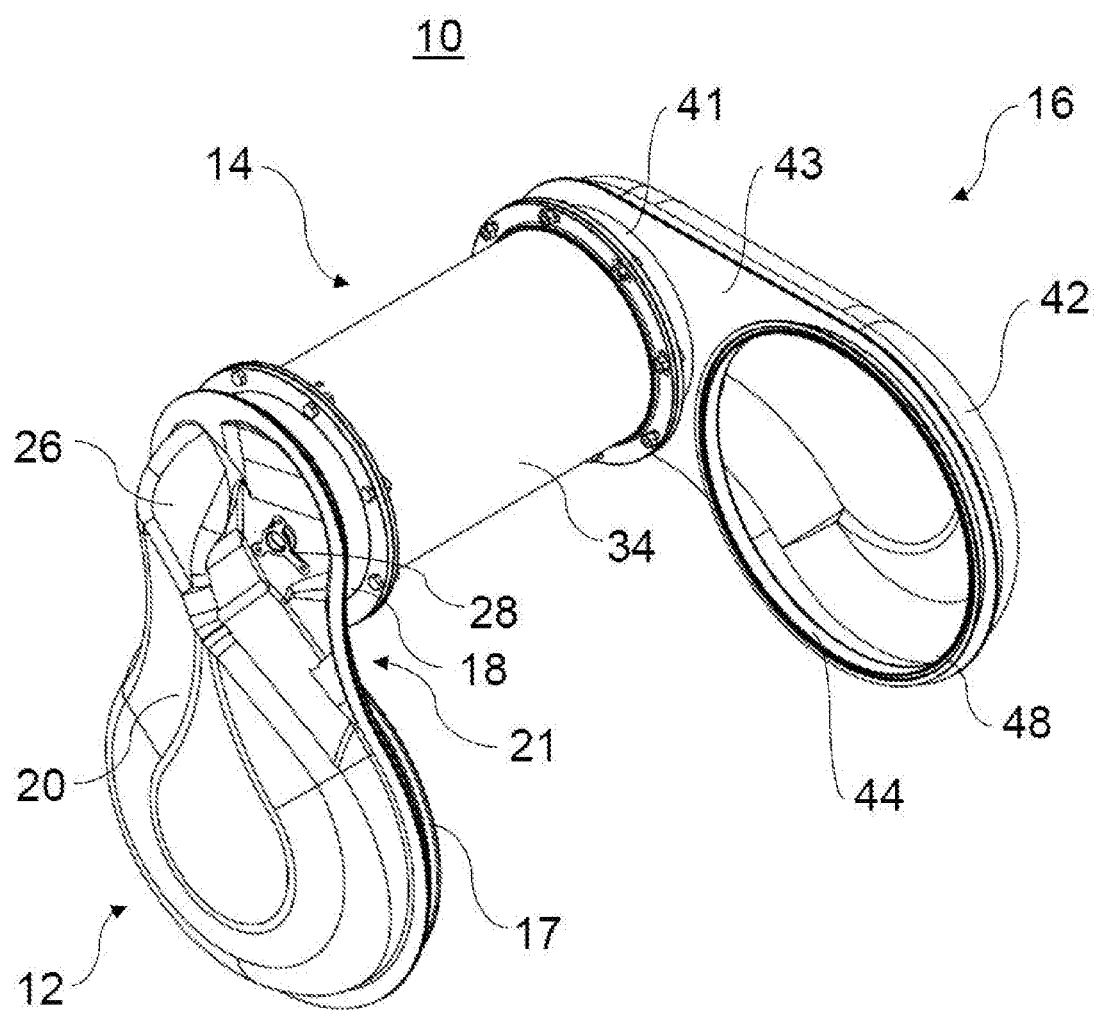

(52) U.S. Cl.
CPC .......... *B01F 5/0451* (2013.01); *B01F 5/0648* (2013.01); *F01N 3/2066* (2013.01); *F01N 3/2892* (2013.01); *B01F 2005/0022* (2013.01); *B01F 2005/0091* (2013.01); *F01N 2470/24* (2013.01)

(58) Field of Classification Search
CPC ...... B01F 2005/0091; F01N 3/10; F01N 3/20; F01N 3/2066; F01N 3/28; F01N 3/2892; F01N 2470/24; F01N 2610/02
See application file for complete search history.

(56) References Cited

FOREIGN PATENT DOCUMENTS

| | | | |
|---|---|---|---|
| DE | 202015102092 U1 | 8/2015 | |
| DE | 112014005083 T5 | 8/2016 | |
| DE | 102016004333 A1 * | 10/2017 | .......... F01N 3/2066 |
| DE | 102016004333 A1 | 10/2017 | |
| EP | 2204556 A1 | 7/2010 | |
| EP | 2518287 A1 | 10/2012 | |
| EP | 2 985 434 A1 | 2/2016 | |
| EP | 3 067 529 A1 | 9/2016 | |
| EP | 3279440 A1 | 2/2018 | |
| WO | 2005073524 A1 | 8/2005 | |
| WO | 2009024815 A2 | 2/2009 | |
| WO | 2012052690 A1 | 4/2012 | |

OTHER PUBLICATIONS

European Partial Search Report in related case EP19155498, dated Jul. 23, 2019.
European Final Search Report in related case EP19155498, dated Nov. 28, 2019.
German Search Report in related case, DE102018103368.0, dated Jul. 15, 2019.

* cited by examiner

APPARATUS FOR MIXING EXHAUST GAS AND AN ADDITIVE

The invention relates to an apparatus for mixing an exhaust gas stream with an additive, in particular a reducing agent, in an exhaust gas section of an internal combustion engine, in particular of a motor vehicle.

Apparatuses for mixing an exhaust gas stream with an additive are used, in particular, in conjunction with what are known as SCR catalytic converters. A reducing agent, for example an aqueous urea solution, can be injected as an additive upstream of the mixing apparatus or into the mixing apparatus. The reducing agent can mix with the exhaust gas. In this way, nitrogen oxides in the exhaust gas can be reduced in a known way with the aid of the SCR catalytic converter.

DE 10 2012 008 556 A1 discloses an apparatus for the exhaust gas aftertreatment of an exhaust gas mass stream in an exhaust gas section, an injector for feeding reducing agent into the exhaust gas mass stream being arranged in the exhaust gas section, and a cylindrical exhaust gas section segment having a tangential inlet. A mixer for reversing the rotational direction of the exhaust gas mass stream is arranged downstream of the tangential inlet. Downstream of the mixer, the injector is arranged in the cylindrical exhaust gas section segment on the centre axis of the mixer or upstream of the inlet in a region of an exhaust gas section segment with a reduced cross section.

EP 3 067 529 A1 discloses an apparatus for the aftertreatment of exhaust gas of an internal combustion engine by way of mixing of the exhaust gas with an at least partially liquid additive which is metered in, evaporating of the liquid component of the additive, and preparation of the exhaust gas/additive mixture for a downstream catalytic converter. The apparatus comprises a pre-chamber, a main chamber, a mixing device, in which the exhaust gas can be mixed with an additive, and an intermediate device, via which an exhaust gas part stream can be fed from the pre-chamber to the mixing device on the end side. The intermediate device is provided with swirl elements.

Further mixing apparatuses are known, for example, from WO 2009/024815 A2 and EP 2 985 434 A1.

The invention is based on the object of providing an alternative and/or improved apparatus for mixing an exhaust gas stream with an additive. In particular, an installation space is to be utilized in an optimum manner and/or an arrangement of the components of the apparatus is to be adapted to one another in an improved manner.

The object is achieved by way of an apparatus according to the independent claim. Advantageous developments are specified in the dependent claims and the description.

The apparatus is suitable for mixing an exhaust gas stream with an additive, in particular a reducing agent (for example, a liquid or a liquid/gas mixture, in particular an aqueous urea solution). The apparatus has a (for example, cylindrical) mixing pipe for mixing the exhaust gas stream with the additive. The apparatus has a first deflection pipe for deflecting the exhaust gas stream, in particular by 180°. The exhaust gas stream can be fed to the mixing pipe on the end side via the first deflection pipe. The first deflection pipe has a fastening region for attaching an additive injector to the first deflection pipe. The first deflection pipe has a swirl generating wall region which is arranged on the end side with respect to the mixing pipe and is configured to impart a swirl to the exhaust gas stream.

The apparatus makes an arrangement possible which is favourable in terms of installation space, since the first deflection pipe is used both for the end-side swirl generation and for attaching the additive injector. Here, the shape of the first deflection pipe can fulfil a dual function. Firstly, a swirl can be generated and an exhaust gas stream can be guided by way of the shape of the first deflection pipe, in particular of a deflection hood of the first deflection pipe, and secondly space can be produced for the arrangement of the additive injector. That is to say, the functions of swirl generation and additive injector fastening can be realized in one component in the first deflection pipe, in particular the deflection hood of the first deflection pipe.

In particular, the apparatus can be suitable for integration into an exhaust gas aftertreatment system of an internal combustion engine of a motor vehicle, in particular of a commercial vehicle.

In one particularly preferred exemplary embodiment, the first deflection pipe has a deflection hood. The swirl generating wall region and/or the fastening region are/is provided on the deflection hood. In this way, the dual function which is addressed above can be integrated into the deflection hood which provides sufficient space for the swirl generating wall region and the fastening region for the additive injector.

In particular, together with a pipe body section, to which the deflection hood is fastened, the deflection hood can form the first deflection pipe.

In one preferred exemplary embodiment, the swirl generating wall region is configured as a helical (helix section-shaped) ramp. The helical ramp makes swirl generation possible in the exhaust gas stream on the end side with respect to the mixing pipe. The fastening section and therefore the additive injector can be arranged in an inner region or on an inner side of the helical ramp on an outer side of the first deflection pipe, in particular the deflection hood of the first deflection pipe.

In one exemplary embodiment, the swirl generating wall region is configured to generate a swirl on an inner side of the first deflection pipe and to provide space on an outer side of the first deflection pipe for arranging the fastening region and/or the additive injector. As an alternative or in addition, the fastening region and/or the additive injector are/is arranged on the end side with respect to the mixing pipe next to the swirl generating wall region. As an alternative or in addition, the fastening region and/or the additive injector are/is arranged centrally with respect to a helix centre axis, about which the swirl generating wall region extends helically. As an alternative or in addition, the fastening region and/or the additive injector are/is arranged in such a way that an additive can be injected from the additive injector into an eye of the swirl of the exhaust gas stream which is loaded with the swirl.

In a further exemplary embodiment, a helix centre axis, about which the swirl generating wall section extends helically, runs in a manner which is spaced apart, in particular in parallel, with respect to a centre longitudinal axis of the mixing pipe.

In one embodiment, furthermore, the apparatus has an additive injector, in particular a reducing agent injector. The additive injector is attached to the fastening region in such a way that additive can be fed from the additive injector to the mixing pipe on the end side and/or the additive injector is arranged eccentrically with respect to a centre longitudinal axis of the mixing pipe. This makes it possible that the additive is injected into the exhaust gas stream eccentrically with respect to the centre longitudinal axis and therefore preferably centrally with respect to the helix centre axis (and therefore centrally with respect to the eye of the swirl).

In a further embodiment, the mixing pipe has an inner pipe which is, in particular, cylindrical (for example, circular-cylindrical or in the form of an elliptical cylinder) and an outer pipe which is, in particular, cylindrical (for example, circular-cylindrical or in the form of an elliptical cylinder) and surrounds the inner pipe (for example, coaxially). For example, there can be an annular gap between the inner pipe and the outer pipe in an annular manner, for example in the form of a circular ring or an elliptical ring. The exhaust gas stream can preferably be capable of being fed via the first deflection pipe in a first exhaust gas part stream to the inner pipe and in a second exhaust gas part stream to a region between the inner pipe and the outer pipe on the end side. In this way, it can be made possible that the first exhaust gas part stream mixes with the additive in the inner pipe, whereas the second exhaust gas part stream heats the inner pipe. The heating increases the evaporation of liquid additive droplets which impinge onto the inner circumferential face of the inner pipe, with the result that the depositing of said additive droplets is reduced.

In one preferred embodiment, the first exhaust gas part stream is greater than the second exhaust gas part stream. As an alternative or in addition, the first exhaust gas part stream has a volumetric share of between 70% and 90%, in particular 80%, of the exhaust gas stream through the first deflection pipe. As an alternative or in addition, the second exhaust gas part stream has a volumetric share of between 10% and 30%, in particular 20%, of the exhaust gas stream through the first deflection pipe. As an alternative or in addition, a gap between the inner pipe and the outer pipe is between 5 mm and 10 mm, in particular 8 mm.

In one preferred design variant, the inner pipe is of thermally conducting configuration for the transfer of thermal energy from the second exhaust gas part stream to an inner circumferential face of the inner pipe. In this way, the second exhaust gas part stream can heat the inner pipe in order to prevent and/or reduce condensation of the additive on an inner circumferential face of the inner pipe. For example, the inner pipe can be produced from a thermally conducting metal or a thermally conducting metal alloy.

In one design variant, an outer circumferential face of the inner pipe is profiled, in particular in order to increase a thermal transfer between the region (between the inner pipe and the outer pipe) and the inner pipe.

In a further design variant, a contour of an end face of the inner pipe which faces the first deflection pipe (in particular, the deflection hood of the first deflection pipe) follows an inner contour of the swirl generating wall region (for example, the helical ramp) at least in sections at a substantially constant spacing. It is also possible that there are different spacings from the inner contour of the swirl generating wall region at least in sections, in order to optimize the flow. As an alternative or in addition, an end face of the inner pipe which faces the first deflection pipe (in particular, the deflection hood of the first deflection pipe) is of helical configuration at least in sections. In this way, a homogeneous inflow into the inner pipe can be achieved.

An outlet contour (for example, an end face) of the inner pipe can preferably be profiled, in particular with a crown profile, a pointed profile and/or an undulating profile. For example, the profiles can be provided in a radially obliquely outward manner, in a radially obliquely inward manner, or in an alternating way in a radially obliquely outward manner and a radially obliquely inward manner.

It is also possible that an outlet region of the inner pipe is of hood-shaped configuration. For example, the shape can extend partially into the second deflection pipe and/or can bring about a flow deflection by, for example, 90°.

It is noted explicitly that the configuration of the outlet contour and the outlet region of the inner pipe of the mixing pipe is disclosed herein independently of all other features which are described herein.

In particular, a pitch of the helical shape of the end face can correspond substantially to a pitch of the helical shape of the swirl generating wall section.

In one exemplary embodiment, the apparatus has an injection shield which is arranged at least partially around an (additive) injection opening of the additive injector and/or of the first deflection pipe (for example, the deflection hood). In this way, a negative influence of the injection of the additive by way of the swirl-shaped exhaust gas stream can be prevented or reduced.

In a further exemplary embodiment, the apparatus has a second deflection pipe for deflecting the exhaust gas stream, in particular by 180°. The second deflection pipe is arranged downstream of the mixing pipe.

In particular, the first deflection pipe can be arranged directly upstream of the mixing pipe and/or the second deflection pipe can be arranged directly downstream of the mixing pipe. As an alternative or in addition, the first deflection pipe can be fastened to the mixing pipe and/or the mixing pipe can be fastened to the second deflection pipe.

The second deflection pipe can preferably likewise be formed from a deflection hood and a pipe body section.

In one design variant, an inlet opening of the first deflection pipe faces an outlet opening of the second deflection pipe. As an alternative or in addition, an inlet opening of the first deflection pipe is offset with respect to an outlet opening of the second deflection pipe in a circumferential direction about a centre longitudinal axis of the mixing pipe, in particular by between 90° and 270°. As an alternative or in addition, an inlet opening of the first deflection pipe does not overlap with an outlet opening of the second deflection pipe, as viewed in a direction of a centre longitudinal axis of the mixing pipe. In this way, a space-saving arrangement and a combination with further components of the exhaust gas section can be made possible.

The apparatus can preferably be arranged downstream of an oxidation catalytic converter and/or a particulate filter, and/or upstream of an SCR catalytic converter.

The oxidation catalytic converter and/or the particulate filter can preferably be arranged directly upstream of the apparatus and can open into the inlet opening of the first deflection pipe. In particular, a longitudinal axis of the oxidation catalytic converter and/or the particulate filter can run substantially parallel to the centre longitudinal axis of the mixing pipe.

It is also possible that the SCR catalytic converter is arranged directly downstream of the apparatus, and the outlet opening of the second deflection pipe opens into the SCR catalytic converter. In particular, a longitudinal axis of the SCR catalytic converter can run substantially parallel to the centre longitudinal axis of the mixing pipe.

In a further design variant, the first deflection pipe and/or the second deflection pipe are/is of double-walled configuration with an integrated thermal insulation means. The thermal insulation means makes it possible that an undesired cooling of the exhaust gas stream in the apparatus is prevented or at least reduced.

In particular, the deflection hood of the first deflection pipe and/or the deflection hood of the second deflection pipe can be of double-walled configuration with the integrated thermal insulation means.

The present disclosure is also directed to a motor vehicle, in particular a commercial vehicle, having an apparatus as disclosed herein.

It is also possible to use the apparatus as disclosed herein for passenger cars, large engines, off-road vehicles, stationary engines, marine engines, etc.

In accordance with a further aspect, the present disclosure is directed to a deflection hood for an apparatus for mixing an exhaust gas stream with an additive. The deflection hood is configured to deflect the exhaust gas stream, in particular by 180°. The exhaust gas stream can be fed on the end side to a mixing pipe via the deflection hood. The deflection hood has a fastening region for attaching an additive injector to the deflection hood. The deflection hood has a swirl generating wall region which can be arranged on the end side with respect to the mixing pipe and is configured to impart a swirl to the exhaust gas stream.

In particular, the deflection hood can be configured like the deflection hood disclosed herein of the first deflection pipe.

Figure 2:
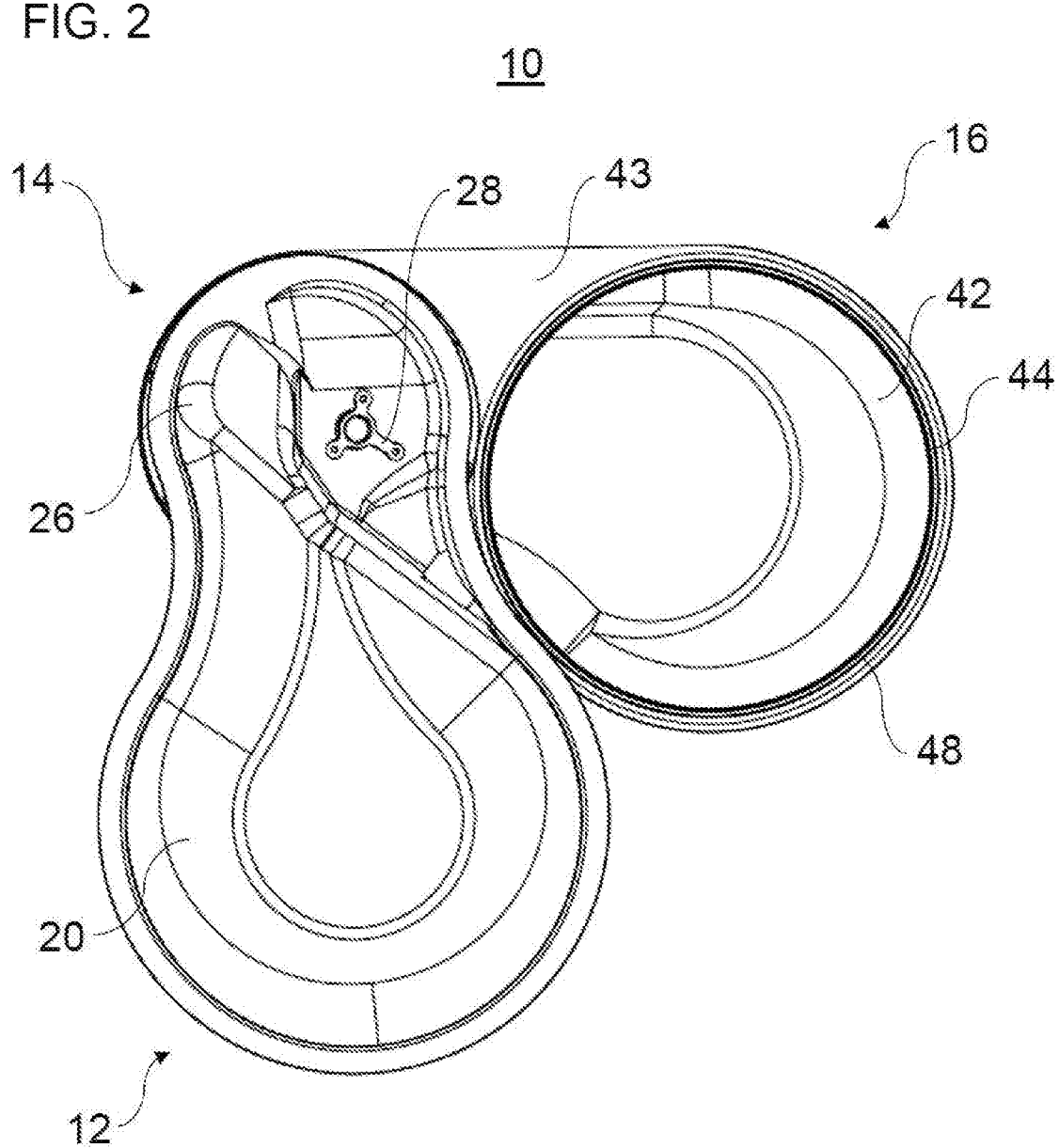
Figure 3:
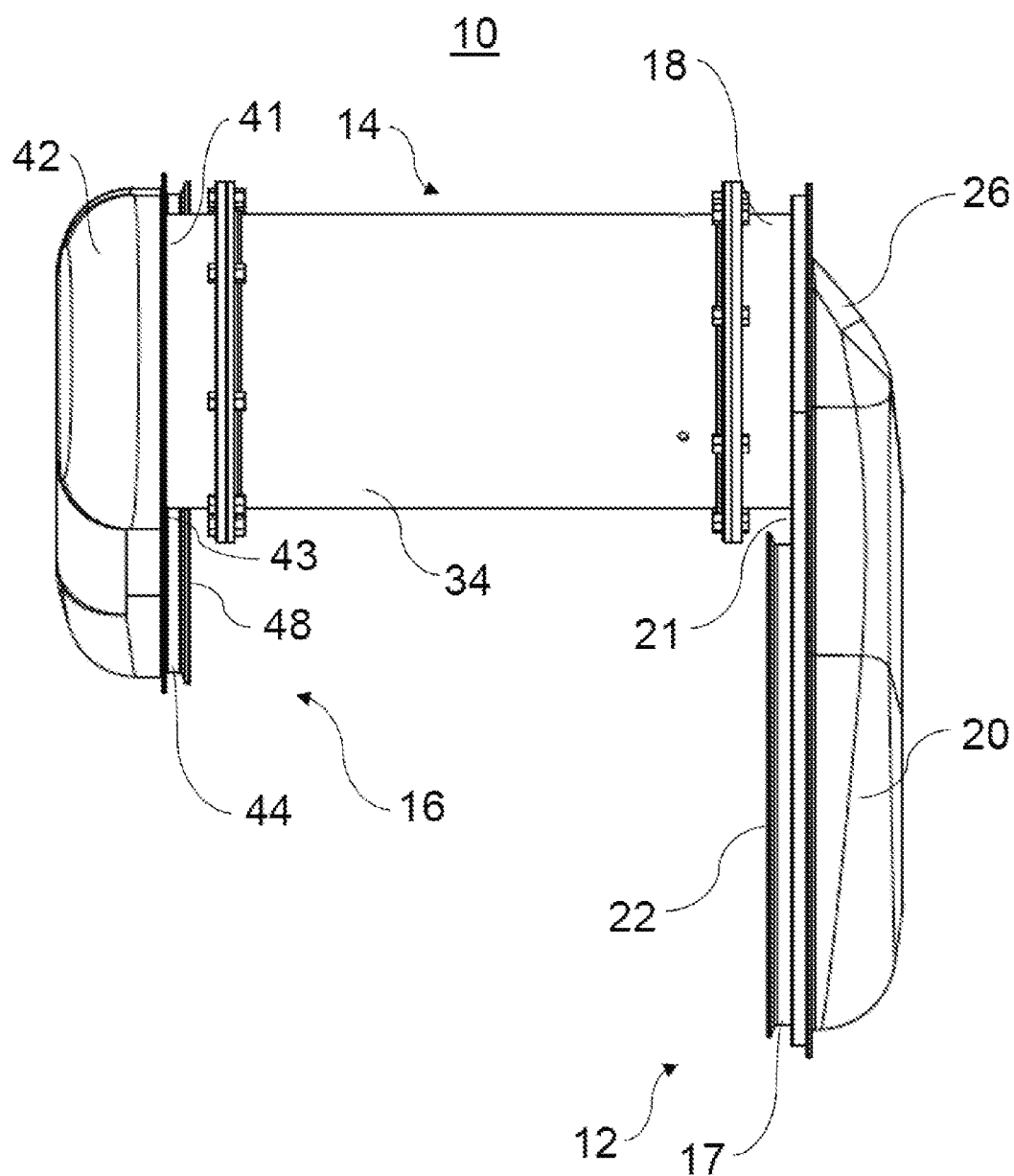
Figure 4:
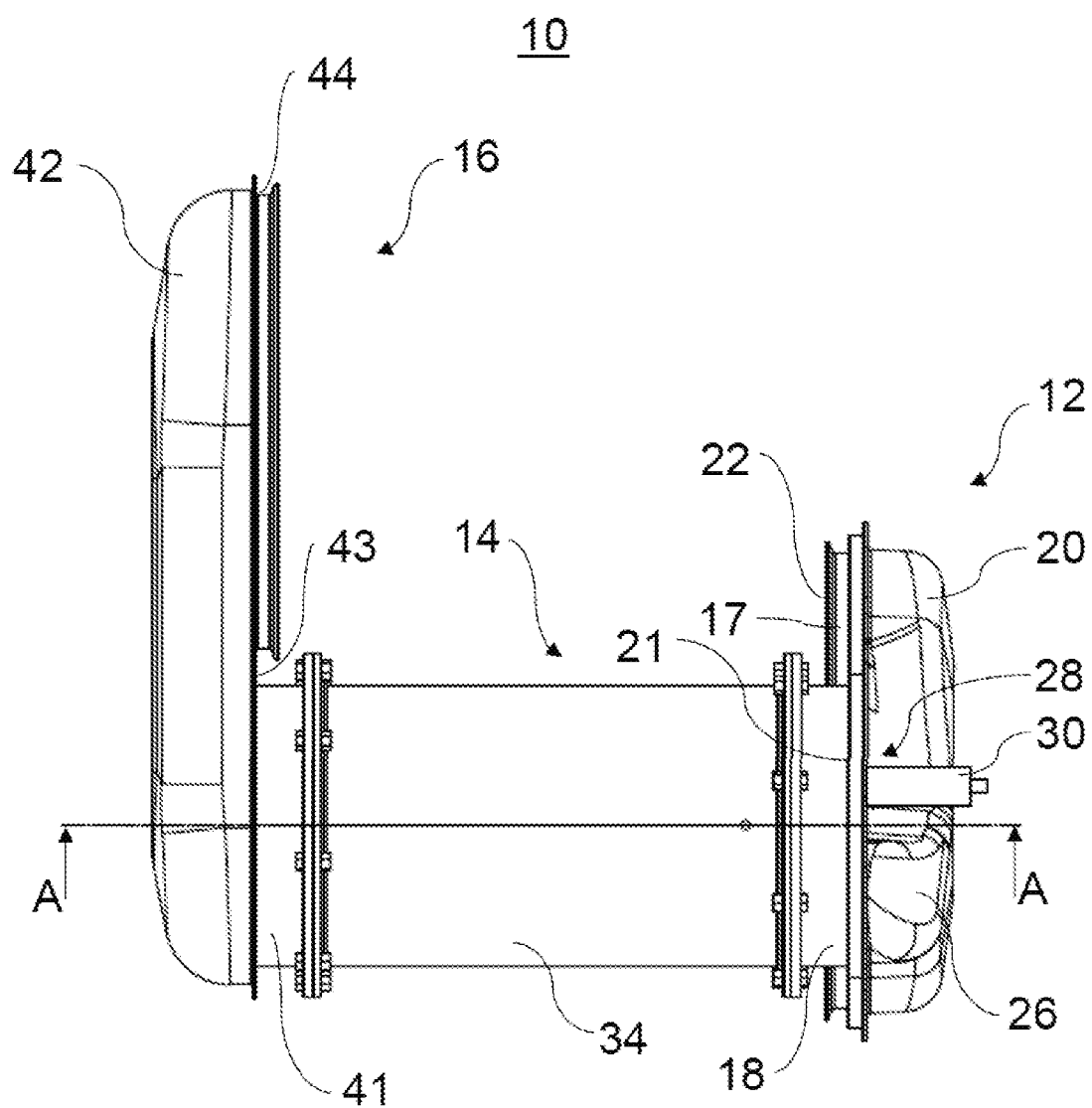
Figure 5:
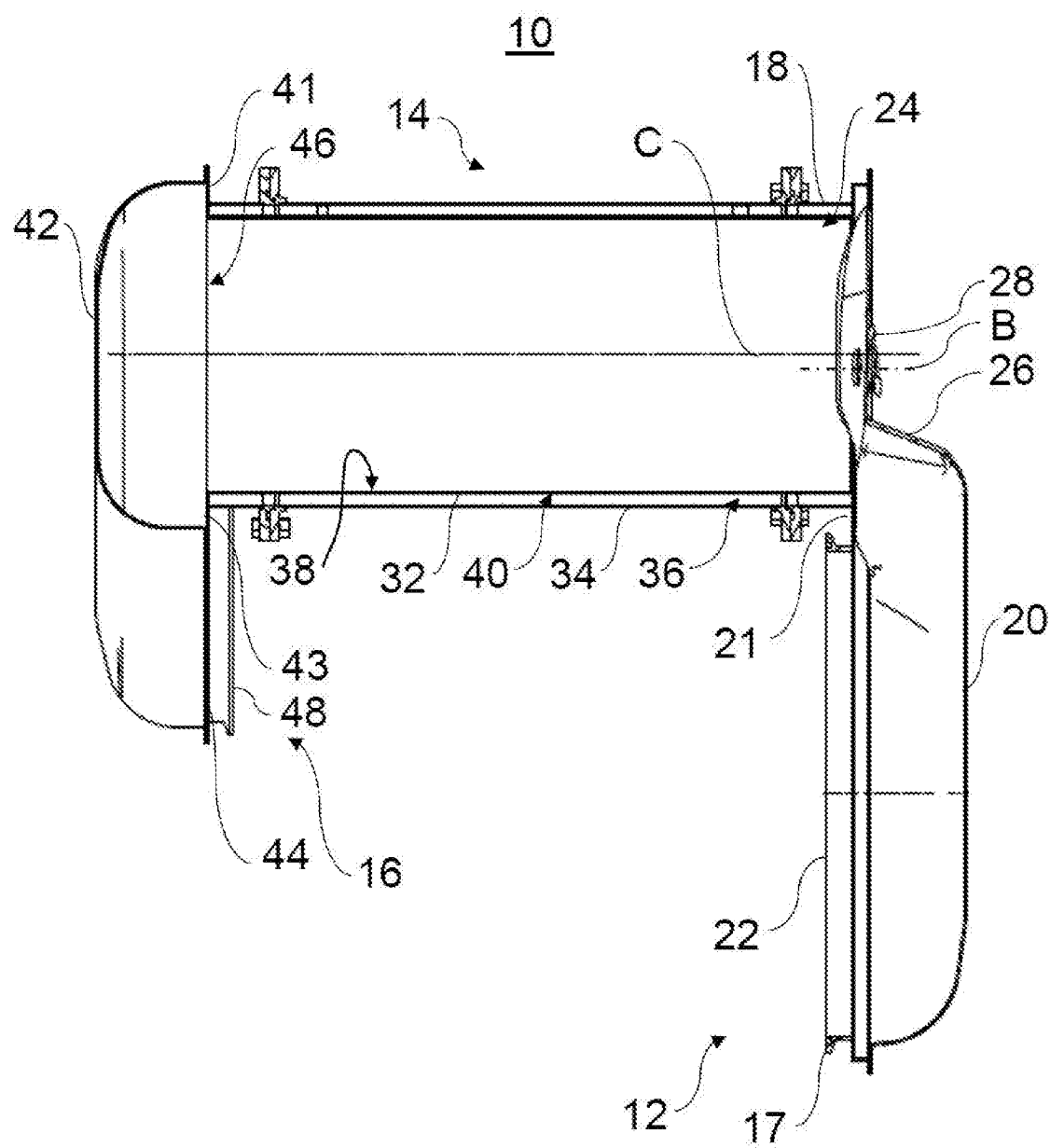
Figure 6:
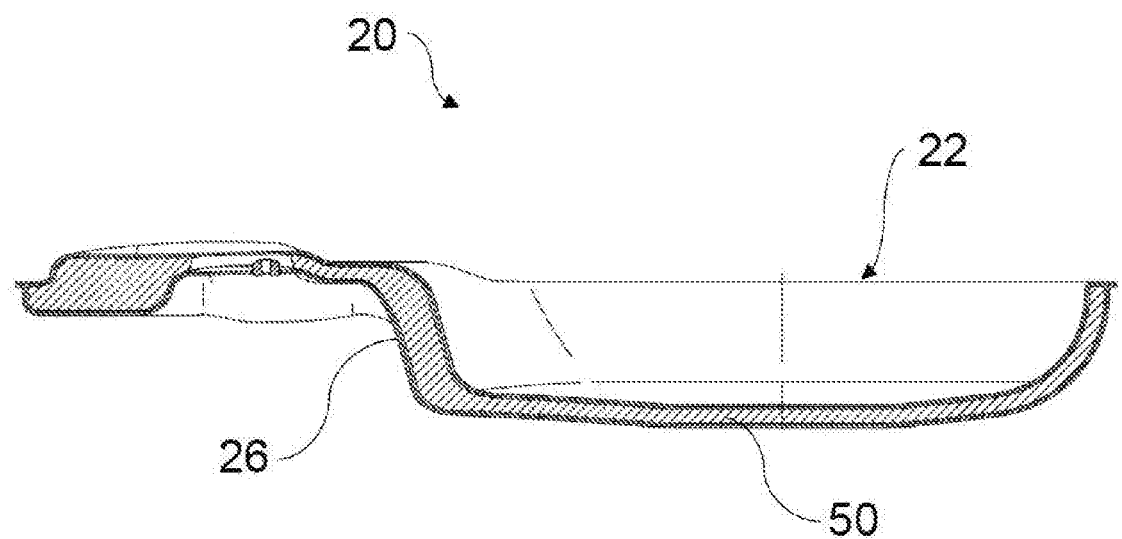
Figure 7:
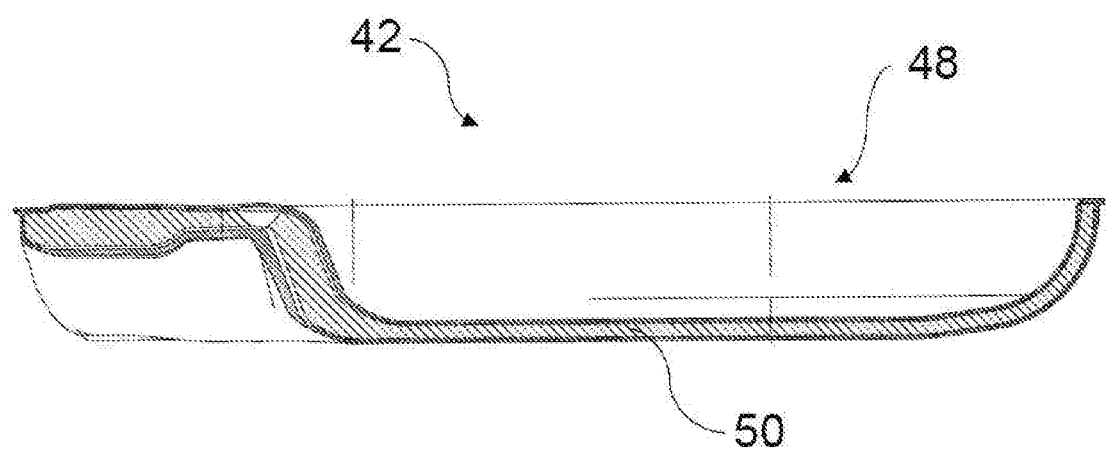
Figure 8:
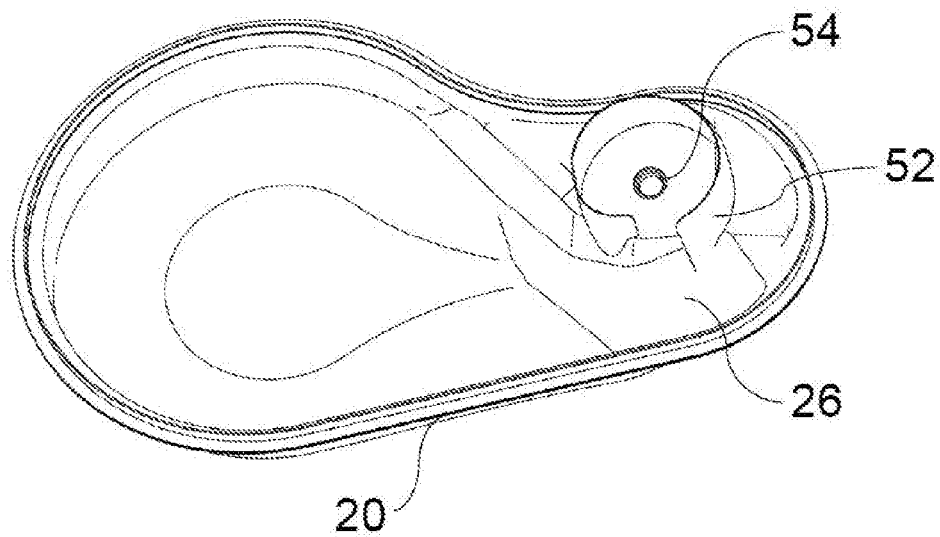
Figure 9:
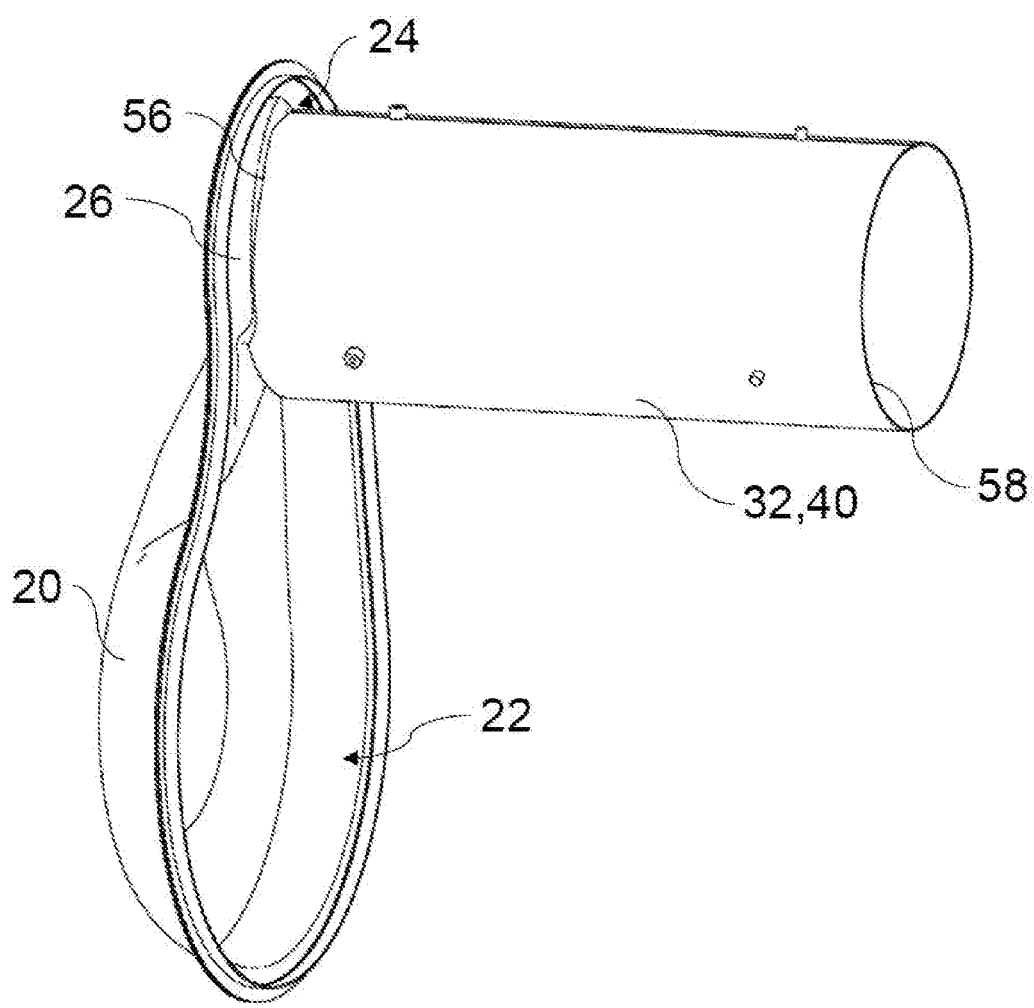
Figure 10:
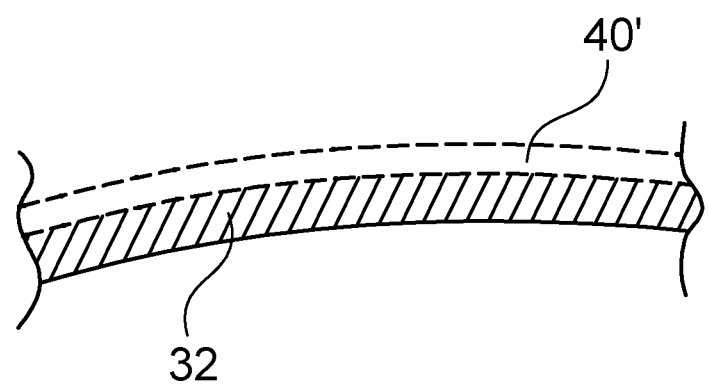

The above-described preferred embodiments and features of the invention can be combined with one another in any desired manner. Further details and advantages of the invention will be described in the following text with reference to the appended drawings, in which:

FIG. 1 shows a perspective view of a mixing apparatus in accordance with one exemplary embodiment, FIG. 2 shows a plan view of the exemplary mixing apparatus, FIG. 3 shows a side view of the exemplary mixing apparatus, FIG. 4 shows a further side view of the exemplary mixing apparatus, FIG. 5 shows a sectional view of the exemplary mixing apparatus along the line A-A in FIG. 4, FIG. 6 shows a sectional view through the deflection hood of the exemplary mixing apparatus, FIG. 7 shows a sectional view through a further deflection hood of the exemplary mixing apparatus, FIG. 8 shows a perspective view of an injection shield of the exemplary mixing apparatus, FIG. 9 shows a perspective view of a deflection hood and an inner pipe of the exemplary mixing apparatus, and FIG. 10 shows a schematic, fragmentary, cutaway view of an alternative embodiment on an inner pipe of FIG. 9.

The embodiments which are shown in the figures correspond to one another at least partially, with the result that similar or identical parts are provided with the same reference signs and, in order to describe them, reference is also made to the description of the other embodiments and/or figures, in order to avoid repetition.

FIGS. 1 to 5 show a mixing apparatus 10. The mixing apparatus 10 can be used, in particular, to mix exhaust gas with an additive in an exhaust gas system of an internal combustion engine. The internal combustion engine is preferably included in a commercial vehicle, for example in a bus or a lorry. The mixing apparatus 10 preferably serves to inject a reducing agent, for example an aqueous urea solution, and to mix the reducing agent with exhaust gas for an SCR catalytic converter (catalytic converter for selective catalytic reduction) which is arranged downstream for the reduction of nitrogen oxides.

The mixing apparatus 10 has a first deflection pipe 12, a mixing pipe 14 and a second deflection pipe 16. The first deflection pipe 12 is arranged upstream of the mixing pipe 14. The mixing pipe 14 is arranged between the first deflection pipe 12 and the second deflection pipe 16. The second deflection pipe 16 is arranged downstream of the mixing pipe 14.

The first deflection pipe 12 has an inlet-side pipe body section 17, an outlet-side pipe body section 18, a deflection hood 20 and a pipe plate 21. Furthermore, the first deflection pipe 12 has an inlet opening 22 in the inlet-side pipe body section 17, an outlet opening 24 in the outlet-side pipe body section 18, a swirl generating wall region 26 and a fastening region 28 for an additive injector 30 (shown merely diagrammatically in FIG. 4).

The pipe body sections 17, 18, the deflection hood 20 and the pipe plate 21 are fastened to one another, in particular in a gas-tight manner, in order to form the first deflection pipe 12. The first deflection pipe 12 extends between the inlet opening 22 and the outlet opening 24 (see FIG. 5). The outlet-side pipe body section 18 is fastened to the mixing pipe 14, for example via a flange connection, as shown. The outlet opening 24 opens into the mixing pipe 14. Via the outlet opening 24, the first deflection pipe 12 feeds an exhaust gas stream on the end side to the mixing pipe 14.

The first deflection pipe 12 can be arranged, for example, downstream of an oxidation catalytic converter, for example a diesel oxidation catalytic converter (DAC), and/or downstream of a particulate filter, for example a diesel particulate filter (DPF).

The first deflection pipe 12, in particular the deflection hood 20 of the first deflection pipe 12, deflects an exhaust gas stream by 180°. A direction of an inlet flow into the first deflection pipe 12 (through the inlet opening 22) is parallel and opposed to a direction of an outlet flow from the deflection pipe 12 into the mixing pipe 14 (through the outlet opening 24).

The swirl generating wall region 26 is arranged on the end side with respect to the mixing pipe 14. The swirl generating wall region 26 is configured as a helical (helix section-shaped) ramp. The swirl generating wall region 26 extends helically about a helix centre axis B (see FIG. 5). The helix centre axis B is parallel and offset with respect to a centre longitudinal axis C (see FIG. 5) of the mixing pipe 14. The swirl generating wall section 26 brings it about that a swirl is imparted to an exhaust gas stream which flows through the first deflection pipe 12. The swirl corresponds to a spiral flow about the helix centre axis B. The exhaust gas stream flows with a swirl out of the first deflection pipe 12 and into the mixing pipe 14.

The fastening region 28 is configured to fasten the additive injector 30 (see FIG. 4). The fastening region 28 can be provided, for example, as a tripod, as shown. The fastening region 28 is arranged eccentrically with respect to the centre longitudinal axis C of the mixing pipe 14. In particular, the fastening region 28 is arranged in such a way that the additive injector 30 (see FIG. 4) injects the additive into an eye of the swirl of the exhaust gas stream which is loaded with the swirl. This makes homogeneous mixing between the exhaust gas and the additive possible. To this end, the fastening region 28 is arranged, in particular, centrally with respect to the helix centre axis B.

The additive injector 30 is configured, in particular, as a reducing agent injector. By means of the additive injector 30, an additive can be injected into the mixing pipe 14, in particular only into an inner pipe of the mixing pipe 14. For example, the additive injector 30 can inject an aqueous urea solution for reducing nitrogen oxides with the aid of an SCR catalytic converter which is connected downstream of the mixing apparatus 10.

The mixing pipe 14 has an inner pipe 32 and an outer pipe 34. In other words, the mixing pipe 14 is of double-walled configuration. The inner pipe 32 and the outer pipe 34 can be arranged, for example, concentrically with respect to the centre longitudinal axis C. The inner pipe 32 can be substantially cylindrical, for example circular-cylindrical or elliptical. The outer pipe 34 can be substantially cylindrical, for example circular-cylindrical or elliptical. Spacer elements can be provided, for example, between the inner pipe 32 and the outer pipe 34.

The exhaust gas stream from the first deflection pipe 12 is fed to the mixing pipe 14. In detail, the exhaust gas stream is fed into the inner pipe 32 of the mixing pipe 14 and into an (annular) region 36 between the inner pipe 32 and the outer pipe 34 (see FIG. 5, for example).

The first exhaust gas part stream which is fed to the inner pipe 32 mixes in the inner pipe 32 with the additive which is injected by the additive injector 30. The swirl loading of the exhaust gas stream assists the mixing between the exhaust gas and the additive.

The exhaust gas part stream which is fed to the region 36 between the inner pipe 32 and the outer pipe 34 serves to heat the inner pipe 32 and keep it warm. As a result, liquid additive droplets evaporate on the inner circumferential face of the inner pipe 32 in an improved manner. The formation of deposits is effectively prevented or reduced.

In order to increase a thermal transfer between the second exhaust gas part stream which flows in the region 36 and the inner circumferential face 38 of the inner pipe 32, the inner pipe 32 can be of thermally conducting configuration. For example, the inner pipe 32 can be manufactured from a thermally conducting material, for example a metal or a metal alloy. It is also possible that an outer circumferential face 40 of the inner pipe 32 is profiled in order to increase a surface area of a surface of the outer circumferential face 40. FIG. 10 shows a a schematic, fragmentary, cutaway view of an alternative embodiment on the inner pipe 32 of FIG. 9. The inner pipe of FIG. 10 has an outer circumferential face 40' having a profile that has increased surface area as compared to the outer circumferential face 40 of FIG. 9.

The first exhaust gas part stream which flows through the inner pipe 32 is greater than the second exhaust gas part stream which flows through the region 36. Tests suggest that particularly preferred ratios exist between the first exhaust gas part stream and the second exhaust gas part stream. Said preferred ratios firstly make satisfactory mixing between the additive and the exhaust gas in the inner pipe 32 and therefore an efficient nitrogen oxide reduction possible. Secondly, said preferred ratios make sufficient heating of the inner pipe 32 possible, in order to reduce or decrease condensation of the additive on the inner circumferential face 38 of the inner pipe 32.

In particular, the first exhaust gas part stream through the inner pipe 32 has a volumetric share of between 70% and 90%, in particular 80%, of the exhaust gas stream through the first deflection pipe 12. The second exhaust gas part stream through the region 36 can have a volumetric share of between 10% and 30%, in particular 20%, of the exhaust gas stream through the first deflection pipe. A gap between the inner pipe 32 and the outer pipe 34 can be between 5 mm and 10 mm, in particular 8 mm.

The exhaust gas stream leaves the mixing pipe 14 and flows into the second deflection pipe 16. In detail, the first exhaust gas part stream which is mixed with the additive leaves the inner pipe 32 of the mixing pipe 14 and flows into the second deflection pipe 16. In addition, the second exhaust gas part stream leaves the region 36 between the inner pipe 32 and the outer pipe 34 and flows into the second deflection pipe 16.

The second deflection pipe 16 has an inlet-side pipe body section 41, a deflection hood 42, a pipe plate 43 and an outlet-side pipe body section 44.

The pipe body sections 41, 44, the deflection hood 42 and the pipe plate 43 are fastened to one another, in particular in a gas-tight manner, in order to form the second deflection pipe 16. The second deflection pipe 12 extends between an inlet opening 46 (see FIG. 5) and an outlet opening 48. The pipe body section 41 is fastened to the mixing pipe 14, for example via a flange connection, as shown. Via the inlet opening 46, the mixing pipe 14 feeds the exhaust gas stream (the first exhaust gas part stream and the second exhaust gas part stream) on the end side to the second deflection pipe 16.

The second deflection pipe 16 can be arranged, for example, upstream of an SCR catalytic converter.

The second deflection pipe 16, in particular the deflection hood 42 of the second deflection pipe 16, deflects an exhaust gas stream by 180°. A direction of an inlet flow into the second deflection pipe 16 (through the inlet opening 46) is parallel and opposed to a direction of an outlet flow from the second deflection pipe 16 (through the outlet opening 48).

In order to make a space-saving arrangement of the mixing apparatus 10 and the upstream arranged exhaust gas aftertreatment components and the downstream arranged exhaust gas aftertreatment components possible, the inlet opening 22 of the first deflection pipe 12 faces the outlet opening 48 of the second deflection pipe 16. In detail, the inlet opening 22 of the first deflection pipe 12 is offset with respect to the outlet opening 48 of the second deflection pipe 16 by 90°, for example, in a circumferential direction about the centre longitudinal axis C of the mixing pipe 14. In this way, the inlet opening 42 of the first deflection pipe 12 and the outlet opening 48 of the second deflection pipe 16 do not overlap (see FIG. 2), as viewed in a direction of the centre longitudinal axis C of the mixing pipe 14.

FIGS. 6 and 7 show preferred embodiments for the deflection hoods 20 and 42.

The deflection hoods 20, 42 are of double-walled configuration. A thermal insulation means 50 is introduced between the walls of the deflection hoods 20, 42. The thermal insulation means 50 can have, for example, one or more glass fibre mats. The thermal insulation means 50 can reduce undesired cooling of the exhaust gas stream. The respective inner walls and outer walls of the deflection hood 20, 42 can be connected to one another, for example, in a non-positive, positively locking and/or integrally joined manner. For example, the respective walls can be welded to one another.

FIG. 8 shows an optional injection shield 52 for the additive injector 30.

The injection shield 52 can be integrally formed on or fastened to the deflection hood 20 of the first deflection pipe 12. The injection shield 52 partially surrounds an injection opening 54 for the additive injector 30 (see FIG. 4) and therefore an injection opening (not shown) of the additive injector 30. The injection shield 52 prevents or reduces an influence of the exhaust gas stream on the injection of the additive by way of the additive injector 30. The injection shield 52 can be of tubular configuration in sections and/or of circular-cylindrical configuration in sections, for example.

FIG. 9 shows one preferred embodiment of the inner pipe 32 of the mixing pipe 14.

An end face 56 of the inner pipe 32 which faces the first deflection pipe 12 is of helical configuration. This can ensure that a spacing is maintained from an inner contour of the deflection hood 20 of the first deflection pipe 12 and, in particular, the helical, swirl generating wall section 26. This makes a homogeneous inflow into the inner pipe 32 possible.

An end face 58 of the inner pipe 32 which faces the second deflection pipe 16 can be configured for flow optimization. In one example (not shown), the end face 58 can be, for example, profiled, for example in a crown profile, a pointed profile, an undulating profile or the like. For example, the profiles can be provided in a radially obliquely outward manner, in a radially obliquely inward manner, or in an alternating way in a radially obliquely outward manner and a radially obliquely inward manner. It is also possible for the outlet region of the inner pipe 32 to be of hood-like configuration, for example with a hood which extends partially into the second deflection pipe and/or brings about a flow deflection by, for example, 90° (not shown).

The invention is not restricted to the above-described preferred exemplary embodiments. Rather, a multiplicity of variants and modifications are possible which likewise utilize the concept of the invention and therefore fall within the scope of protection. In particular, the invention also claims protection for the subject matter and the features of the subclaims independently of the claims, to which they refer. In particular, the features of independent Claim 1 are disclosed independently of one another. In addition, the features of the subclaims are also disclosed independently of all the features of independent Claim 1 and, for example, independently of the features with regard to the presence and/or the configuration of the mixing pipe, the first deflection pipe, the fastening section and/or the swirl generating wall section of independent Claim 1.

LIST OF REFERENCE SIGNS

10 Mixing apparatus
12 First deflection pipe
14 Mixing pipe
16 Second deflection pipe
17 Inlet-side pipe body section
18 Outlet-side pipe body section
20 Deflection hood
21 Pipe plate
22 Inlet opening
24 Outlet opening
26 Swirl generating wall region
28 Fastening region
30 Additive injector
32 Inner pipe
34 Outer pipe
36 Region between the inner pipe and the outer pipe
38 Inner circumferential face
40 Outer circumferential face
41 Inlet-side pipe body section
42 Deflection hood
43 Pipe plate
44 Outlet-side pipe body section
46 Inlet opening
48 Outlet opening
50 Thermal insulation means
52 Injection shield
54 Injection opening
56 End face
58 End face
B Helix centre axis
C Centre longitudinal axis

The invention claimed is:

1. An apparatus for mixing an exhaust gas stream with an additive, comprising:
   a mixing pipe for mixing the exhaust gas stream with the additive; and
   a first deflection pipe for deflecting the exhaust gas stream;
   wherein the exhaust gas stream can be fed on an end side to the mixing pipe via the first deflection pipe, the first deflection pipe has a fastening region for attaching an additive injector to the first deflection pipe,
   the first deflection pipe has a swirl generating wall region which is arranged on the end side with respect to the mixing pipe and is configured to impart a swirl to the exhaust gas stream,
   the swirl generating wall region is configured as a helical ramp, and
   the fastening region and/or the additive injector is/are arranged centrally with respect to a helix center axis, about which the swirl generating wall region extends helically.

2. The apparatus according to claim 1, wherein:
   the first deflection pipe has a deflection hood; and
   the swirl generating wall region and/or the fastening region is/are provided on the deflection hood.

3. The apparatus according to claim 1, wherein:
   the swirl generating wall region is configured to generate a swirl on an inner side of the first deflection pipe and to provide space on an outer side of the first deflection pipe for arranging the fastening region and/or the additive injector; and/or
   the fastening region and/or the additive injector is/are arranged on the end side with respect to the mixing pipe next to the swirl generating wall region; and/or
   the fastening region and/or the additive injector is/are arranged in such a way that an additive can be injected from the additive injector into an eye of the swirl of the exhaust gas stream which is loaded with the swirl.

4. The apparatus according to claim 1, wherein:
   a helix center axis (B), about which the swirl generating wall section extends helically, running in a manner which is spaced apart from and parallel to a center longitudinal axis (C) of the mixing pipe.

5. The apparatus according to claim 1, further comprising:
   the additive injector, wherein the additive injector comprising a reducing agent injector, attached to the fastening region such that additive can be fed from the additive injector to the mixing pipe on the end side and/or the additive injector is arranged eccentrically with respect to a center longitudinal axis (C) of the mixing pipe.

6. The apparatus according to claim 1, wherein:
   the mixing pipe has an inner pipe that is cylindrical and an outer pipe that is cylindrical and surrounds the inner pipe; and
   the exhaust gas stream can be fed via the first deflection pipe in a first exhaust gas part stream to the inner pipe and in a second exhaust gas part stream to a region between the inner pipe and the outer pipe on the end side.

7. The apparatus according to claim 6, wherein:
   the first exhaust gas part stream is greater than the second exhaust gas part stream; and/or
   the first exhaust gas part stream has a volumetric share of between 70% and 90% of the exhaust gas stream through the first deflection pipe, and/or the second exhaust gas part stream has a volumetric share of between 10% and 30% of the exhaust gas stream through the first deflection pipe, and/or a gap between the inner pipe and the inner pipe is between 5 mm and 10 mm.

8. The apparatus according to claim 6, wherein:

the inner pipe has a thermally conducting configuration for the transfer of thermal energy from the second exhaust gas part stream to an inner circumferential face of the inner pipe; and/or the second exhaust gas part stream heats the inner pipe in order to prevent and/or reduce condensation of the additive on an inner circumferential face of the inner pipe.

9. The apparatus according to claim 6, wherein:

an outer circumferential face of the inner pipe is profiled.

10. The apparatus according to claim 6, wherein:

a contour of an end face of the inner pipe which faces the first deflection pipe follows, at least in sections, an inner contour of the swirl generating wall region at a substantially constant spacing and/or has, at least in sections, different spacings from the inner contour of the swirl generating wall region; and/or an end face of the inner pipe which faces the first deflection pipe is of helical configuration at least in sections; and/or an outlet contour of the inner pipe is profiled with a crown profile, a pointed profile and/or an undulating profile; and/or an outlet region of the inner pipe is of hood-shaped configuration.

11. The apparatus according to claim 1, further comprising:

an injection shield arranged at least partially around an injection opening of the additive injector and/or the first deflection pipe.

12. The apparatus according to claim 1, further comprising:

a second deflection pipe configured to deflect the exhaust gas stream by 180°, the second deflection pipe being arranged downstream of the mixing pipe;

an inlet opening of the first deflection pipe facing an outlet opening of the second deflection pipe; and/or an inlet opening of the first deflection pipe being offset with respect to an outlet opening of the second deflection pipe in a circumferential direction about a center longitudinal axis (C) of the mixing pipe by between 90° and 270°; and/or an inlet opening of the first deflection pipe not overlapping with an outlet opening of the second deflection pipe, as viewed in a direction of a center longitudinal axis (C) of the mixing pipe.

13. The apparatus according to claim 1, wherein:

the first deflection pipe and/or a second deflection pipe is/are of double-walled configuration with an integrated thermal insulation means.

14. A motor vehicle having an apparatus for mixing an exhaust gas stream with additive, comprising:

an engine for producing the exhaust gas stream;

a mixing pipe for mixing the exhaust gas stream with the additive; and a first deflection pipe for deflecting the exhaust gas stream;

wherein the exhaust gas stream can be fed on an end side to the mixing pipe via the first deflection pipe, the first deflection pipe has a fastening region for attaching an additive injector to the first deflection pipe, the first deflection pipe has a swirl generating wall region which is arranged on the end side with respect to the mixing pipe and is configured to impart a swirl to the exhaust gas stream;

the swirl generating wall region is configured as a helical ramp, and the fastening region and/or the additive injector is/are arranged centrally with respect to a helix center axis, about which the swirl generating wall region extends helically.

15. The motor vehicle according to claim 14, wherein:

the first deflection pipe has a deflection hood; and the swirl generating wall region and/or the fastening region is/are provided on the deflection hood.

16. The motor vehicle according to claim 15, wherein:

the swirl generating wall region is configured as a helical ramp.

17. The motor vehicle according to claim 14, wherein:

the swirl generating wall region is configured to generate a swirl on an inner side of the first deflection pipe and to provide space on an outer side of the first deflection pipe for arranging the fastening region and/or the additive injector; and/or the fastening region and/or the additive injector is/are arranged on the end side with respect to the mixing pipe next to the swirl generating wall region; and/or the fastening region and/or the additive injector is/are arranged in such a way that an additive can be injected from the additive injector into an eye of the swirl of the exhaust gas stream which is loaded with the swirl.

* * * * *